(12) United States Patent
Miyoshi

(10) Patent No.: US 7,668,669 B2
(45) Date of Patent: Feb. 23, 2010

(54) METHOD FOR ESTIMATING MAGNITUDE OF BACK-AND-FORTH-DIRECTION FORCE EXERTED ON TIRE

(75) Inventor: Akihiro Miyoshi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 143 days.

(21) Appl. No.: 12/076,407

(22) Filed: Mar. 18, 2008

(65) Prior Publication Data

US 2008/0300801 A1 Dec. 4, 2008

(30) Foreign Application Priority Data

May 29, 2007 (JP) .............................. 2007-142215

(51) Int. Cl.
*G01L 1/00* (2006.01)

(52) U.S. Cl. ......................... 702/42; 702/41; 73/146.4; 73/146.5; 73/862.044

(58) Field of Classification Search .................. 702/42, 702/41; 73/146.4–146.5, 862.044
See application file for complete search history.

(56) References Cited

U.S. PATENT DOCUMENTS 7,249,498 B2 7/2007 Miyoshi et al.

*Primary Examiner*—Drew A Dunn
*Assistant Examiner*—Hien X Vo
(74) *Attorney, Agent, or Firm*—Birch, Stewart, Kolasch & Birch, LLP

(57) ABSTRACT

A method for estimating the magnitude of a back-and-forth-direction force exerted on a tire comprises: using a plurality of strain sensors fixed to a tire sidewall capable of outputting data on the magnitude of a strain occurred at the position of the strain sensor; reading the output data from the strain sensors when come to fixed measuring positions predetermined around the tire rotational axis; in relation to each of the strain sensors at the respective measuring positions, calculating the back-and-forth-direction force as an intermediate result by the use of the data read from the strain sensor and a relational expression, whereby the intermediate results are obtained from the respective strain sensors; and computing a mean value of only the valid intermediate result(s) so as to output it as the estimated magnitude of the force.

10 Claims, 4 Drawing Sheets

US 7,668,669 B2

METHOD FOR ESTIMATING MAGNITUDE OF BACK-AND-FORTH-DIRECTION FORCE EXERTED ON TIRE

BACKGROUND OF THE INVENTION

The present invention relates to a method for estimating the magnitude of a back-and-forth-direction force exerted on a pneumatic tire, more particularly to a method capable of estimating the magnitude even if not all of sensors work in order.

A method for estimating the magnitude of a force exerted on a pneumatic tire is disclosed in U.S. Pat. No. 7,249,498, wherein it is described that the magnitude of the force in the back-and-forth-direction can be estimated by the use of one or more strain sensors fixed to the tire sidewall. Indeed, it is possible to estimate the magnitude, but it is based on the premise that all of the sensors work in order.

The most important purpose of estimating the magnitude of the back-and-forth-direction force is to control a brake system of the vehicle, for example so as to construct a well-known anti lock brake system (ABS).

In such a brake system, for safety's sake, it is very important to continue to output the estimated magnitude data toward the brake controller even if not all of the sensors work in order.

SUMMARY OF THE INVENTION

It is therefore, an object of the present invention to provide a method specialized for estimating the magnitude of a back-and-forth-direction force exerted on a pneumatic tire during running, which can continue to output the estimated magnitude date as far as at least one sensor works in order, and which can improve the precision of the estimated magnitude when multiple sensors work in order.

According to the present invention, a method for estimating the magnitude of a back-and-forth-direction force comprises:

using multiple strain sensors fixed to a sidewall of the tire at circumferentially different positions around the rotational axis of the tire, wherein each of the strain sensor is capable of outputting data on the magnitude of a strain occurred at the position of the strain sensor;

reading the output data from the strain sensors when come to measuring positions, wherein the measuring positions are a plurality of fixed positions predetermined around the tire rotational axis;

in relation to each of the strain sensors positioned at the respective measuring positions, calculating the back-and-forth-direction force as an intermediate result by the use of the data read from the strain sensor and a relational expression effectual for the measuring position at which the strain sensor is positioned, whereby a set of the intermediate results are obtained from the respective strain sensors; and computing a mean value of only the verified intermediate results/result so as to output it as the estimated magnitude of the back-and-forth-direction force.

Therefore, unless all of the sensors get out of order, the magnitude of the back-and-forth-direction force can be estimated. Further, by increasing the number of the sensors, the precision of estimation is improved, and the reliability of a system adopting this method such as ABS can be increased, contributing to safe driving.

A further advantageous aspect is that, although the date processing is completely different from that of U.S. Pat. No. 7,249,498, there is a possibility that the raw date obtained from the sensors can be used in common with the method of U.S. Pat. No. 7,249,498. This means that, without the need for additional physical equipments, it is possible to implement both methods with one computer device, and as to the back-and-forth-direction force, the result obtained by the present invention is employed instead of the result obtained by U.S. Pat. No. 7,249,498.

Other and further objects, features and advantages of the invention will appear more fully from the following description.

DESCRIPTION OF THE PREFERRED EMBODIMENTS

Embodiments of the present invention will now be described in detail in conjunction with the accompanying drawings.

The present invention can be applied to pneumatic tires of various types with respect to the internal structure, tire size, intended end-usage and the like as far as the tire sidewalls are deformed according to a force in the back-and-forth direction applied between the ground contacting patch of the tire and the tire rotational axis (more precisely the wheel rim on which the tire is mounted).

Figure 1:
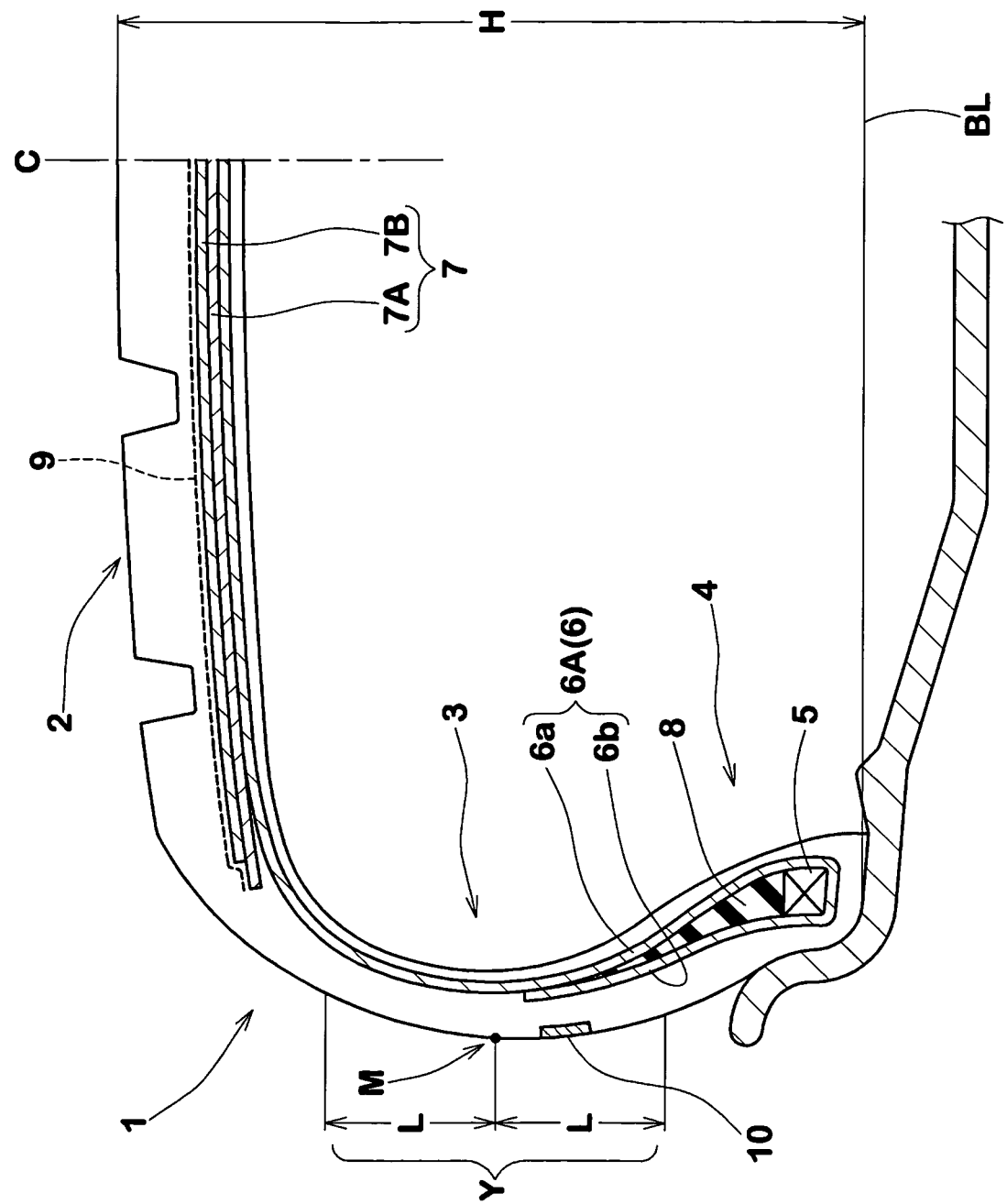
FIG. 1 is a cross sectional view of a pneumatic tire showing a sensor mounting position.

As shown in FIG. 1, a pneumatic tire 1 comprises: a tread 2, a pair of axially spaced beads 4 each with a bead core 5 therein, a pair of sidewalls 3 extending between the tread edges and the beads 4, a carcass 6 extending between the beads 4, and a tread reinforcing belt 7 disposed radially outside the carcass 6.

The carcass 6 is composed of at least one ply 6A of cords arranged radially at an angle in the range of from 70 to 90 degrees with respect to the tire equator, extending between the beads 4 through the tread 2 and sidewalls 3 and turned up around the bead core 5 in each bead 4 from the axially inside to the axially outside of the tire to form a pair of turnup portions 6b and a main portion 6a therebetween.

Between the main portion 6a and each turned up portion 6b, a bead apex 8 made of a hard rubber is disposed so as to extend radially outwardly from the bead core while tapering towards its radially outer end.

The belt comprises a breaker 7 and optionally a band 9. The breaker 7 comprises: at least two cross plies 7A and 7B of high modulus cords laid at an angle of from 10 to 35 degrees with respect to the tire equator CO. The band 9 is disposed on the radially outside of the breaker 7 and composed of a cord or cords wound at a small angle of at most about 5 degrees with respect to the tire equator.

According to the present invention, the magnitude F of the above-mentioned force in the back-and-forth direction exerted on the ground contacting patch during running is estimated based on the magnitude of a strain occurred in the tire sidewall 3 as a result of the tire deformation.

In the case of a pneumatic tire, the magnitude of the surface strain in a specific region Y has a substantially linear correlation with the magnitude F of the force in the back-and-forth direction, therefore, the surface strain is utilized in this embodiment.

As shown in FIG. 1, the region Y lies in the middle of the sidewall 3 and extends radially inward and outward from a midpoint M at 50% of the tire section height H by a radial distance L of 25% of the tire section height H. Preferably, the distance L is 20%, more preferably 15% of the tire section height H, wherein the tire section height H is measured from the bead base line BL to the tread surface at the tire equator C.

Figure 2:
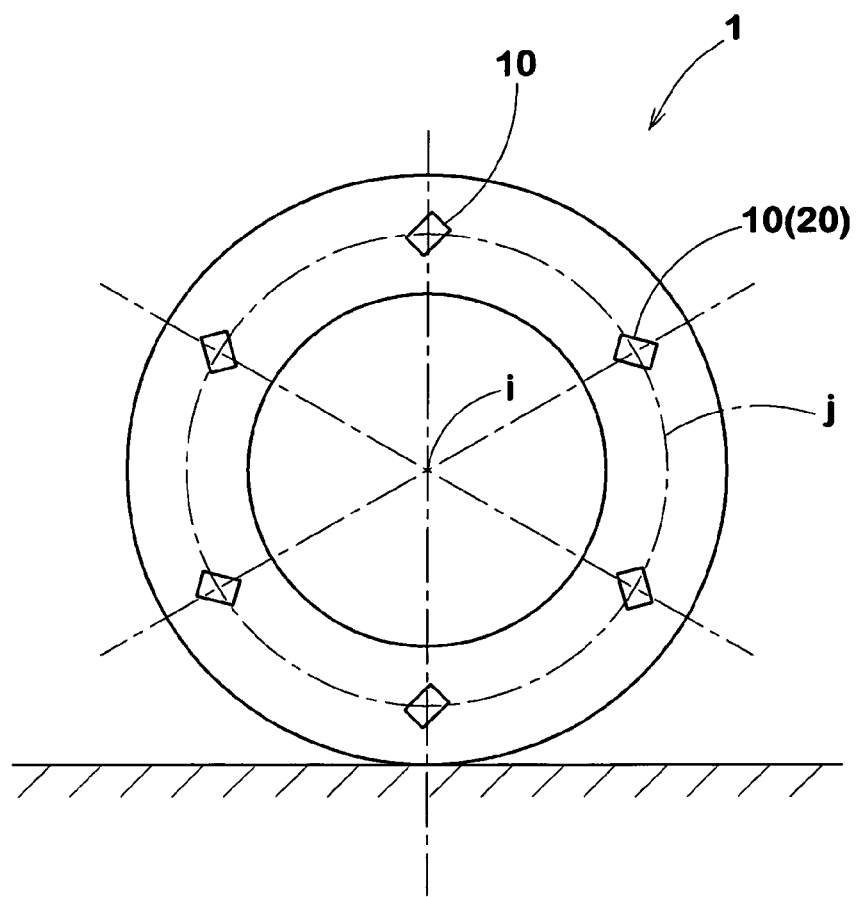
FIG. 2 is a schematic side view of the pneumatic tire showing an arrangement of six sensors.

Within such region Y of one of the sidewalls 3, a plurality of strain sensors 10 are mounted at circumferentially different positions. Preferably, all of the sensors 10 are arranged equiangularly around the tire rotational axis (i) at the same radial height (j) as shown in FIG. 2.

As to the type of the strain sensor 10, various types can be used as far as the sensor 10 can sense the strain and output an electronic data indicative of the magnitude of the strain in this embodiment. In any case, the sensor should be heat-stable and mechanically stable and durable.

For example, piezoelectric element, wire resistance strain gauge and the like may be used, but a combination of a magnet 11 and an magnetometric sensor element 12 is preferably used.

In such combination, at least one magnet 11 and at least one magnetometric sensor element 12 are embedded in a molded resilient body 13 as one unit 20.

The resilient body 13 has to deform following the deformation of the tire sidewall 3, therefore, an elastomer material is used. In view of easiness of molding such as casting and injection molding, the use of a thermoplastic elastomer (TPE) is especially preferred.

As to the magnetometric sensor element 12, various types of elements, for example, hall element, MR element, TMF-MI sensor, TMF-FG sensor, amorphous sensor and the like can be used.

Figure 3:
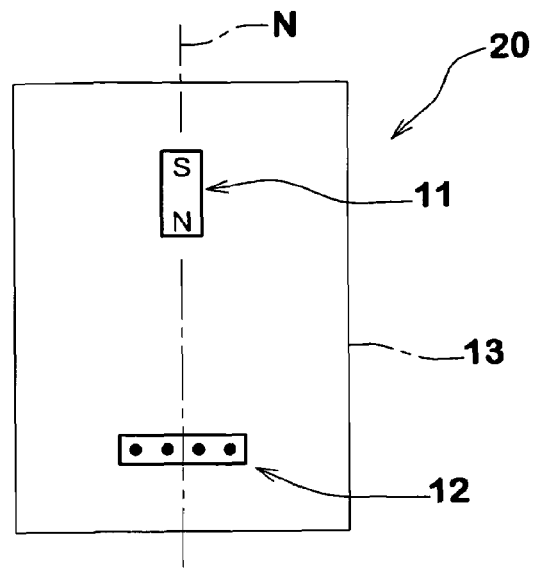
FIGS. 3, 4 and 5 are schematic views each showing a magnet type strain sensor.
Figure 4:
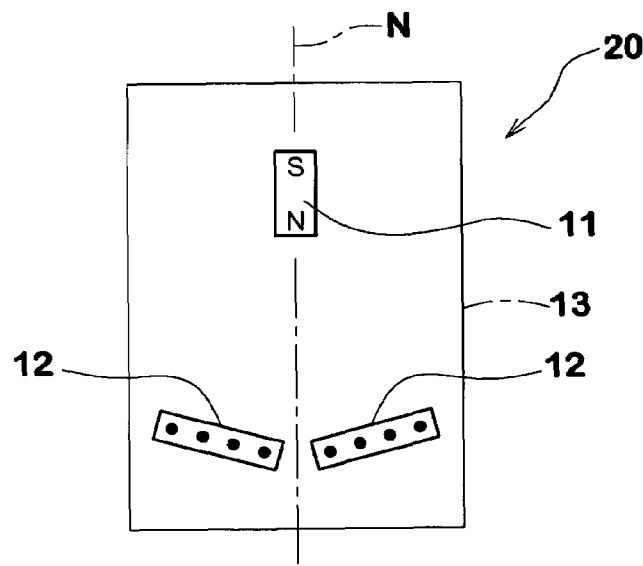
Figure 5:
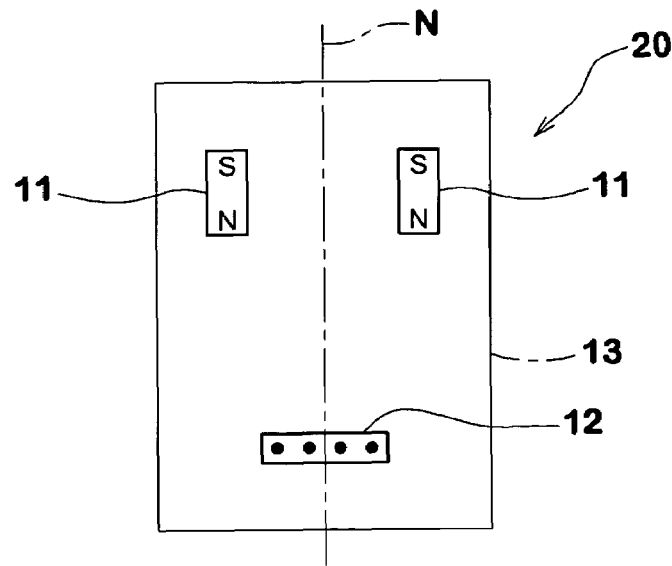

FIGS. 3 to 5 show examples of such magnet type sensor unit 20. In FIG. 3, the sensor unit 20 includes a single magnetometric sensor element 12 and a single magnet 11. In FIG. 4, the sensor unit 20 includes a plurality of magnetometric sensor elements 12 and a single magnet 11. In FIG. 5, the sensor unit 20 includes a single magnetometric sensor element 12 and a plurality of magnets 11.

The sensor units 20 each have a directional sensibility, and the maximum sensibility occurs in a direction N.

Figure 6:
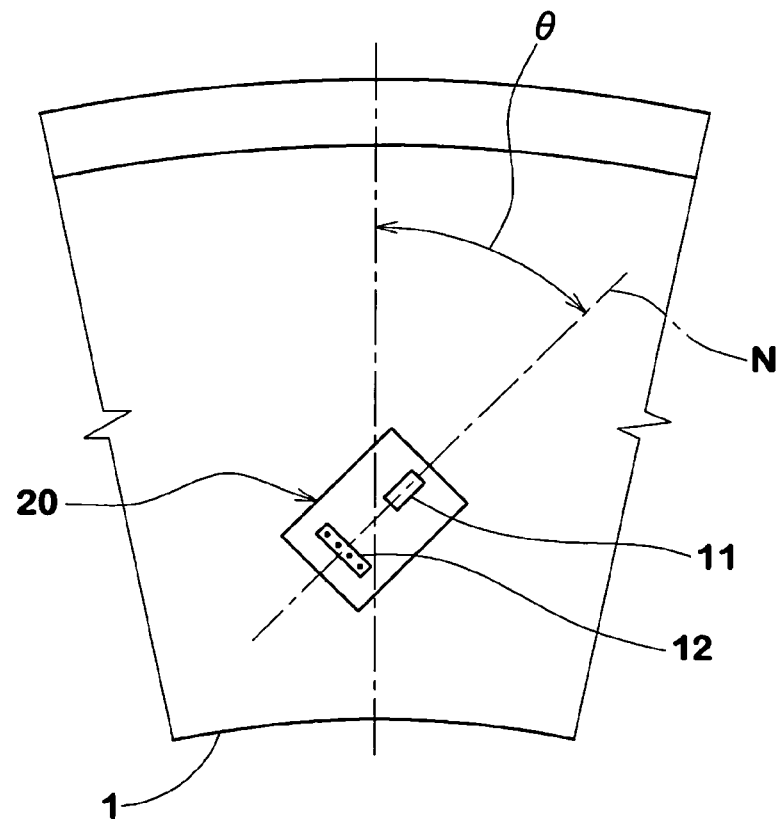
FIG. 6 is a schematic partial side view of the pneumatic tire for explaining the sensor mounting angle.

As shown in FIG. 6, in each of the mounting positions, the sensor unit 20 is oriented such that the angle theta between the maximum sensibility direction N and the tire radial direction becomes in a range of 10 to 80 degrees, preferably 20 to 70 degrees in view of the overall accuracy, more preferably 30 to 60 degrees, still more preferably 40 to 50 degrees when viewed from the side of the tire.

In order to simplify the subsequent data processing performed by a computer, all of the sensors 10 are oriented toward the same direction at the same angle theta.

Since the magnitude F of the back-and-forth-direction force and the magnitude E of the surface strain have a linear correlation, the magnitude F can be expressed by an equation of the first degree:

$$F[n,m]=a[m] \times E[n,m]+b[m]$$

wherein

"n" is an identifying code for the strain sensor,

"m" is an identifying code for the measuring position, and a[m] and b[m] are constants peculiar to the measuring position "m".

Figure 7:
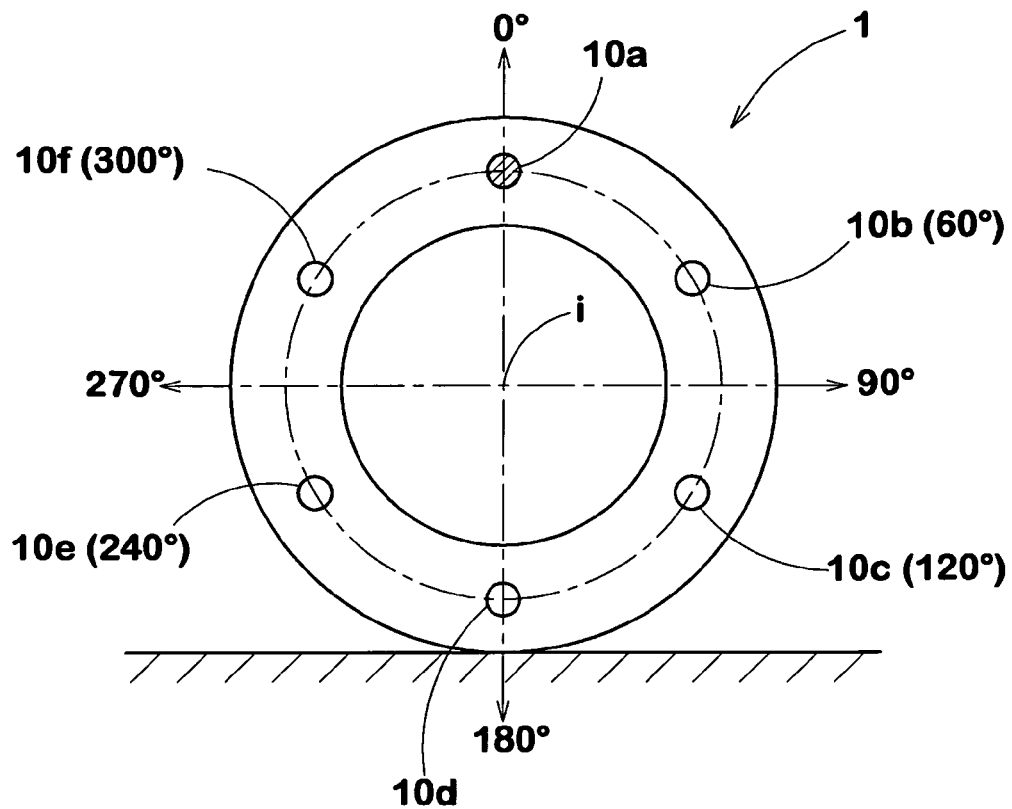
FIGS. 7 and 8 are schematic side views of the tire for explaining the fixed measuring positions and changing sensor positions.
Figure 8:
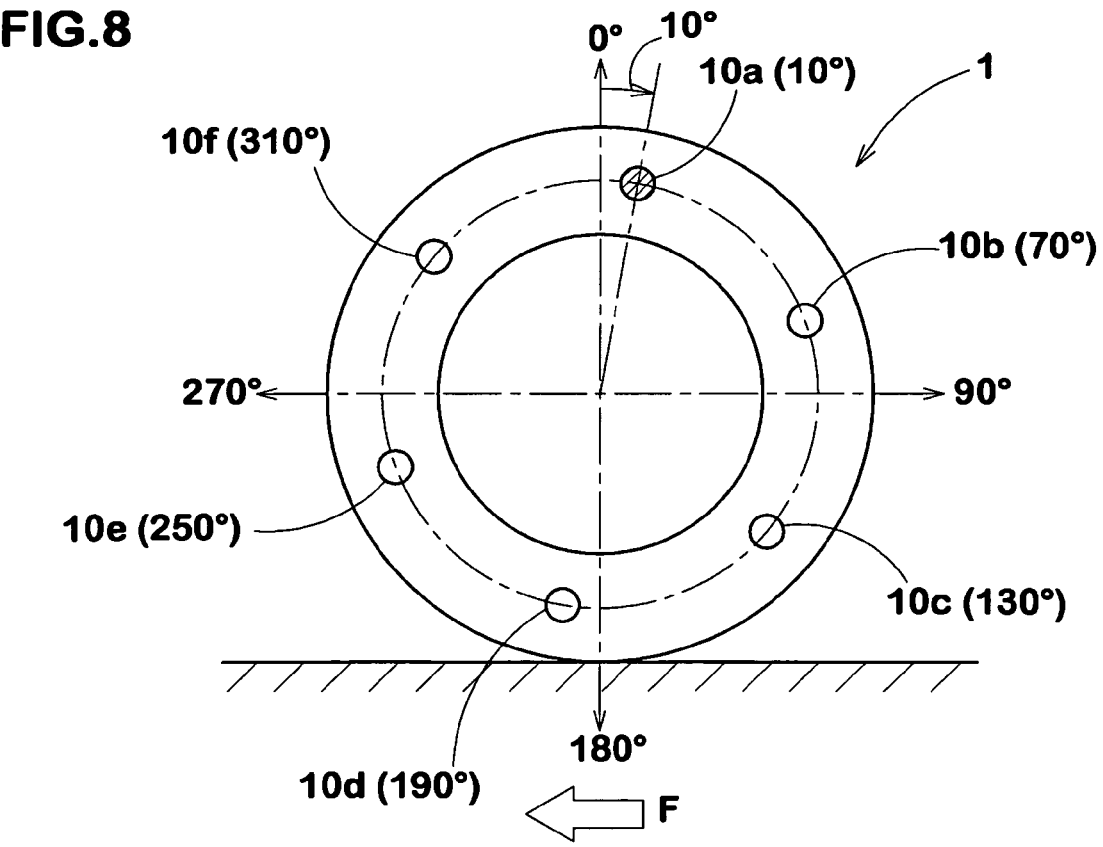

Since the sensors 10 are fixed to the tire sidewall 3, the sensors 10 are moved around the tire rotational axis as the tire rotates. In contrast, the above-mentioned measuring positions are fixed to a static polar coordinate system having the origin set at the tire rotational axis and being parallel with the tire equatorial plane C. The polar angle of zero can be set at any direction, but in this embodiment, for the sake of convenience, it is set at the vertically upward direction as shown in FIGS. 7 and 8.

The number of the measuring positions is preferably an integral multiple of the number of the strain sensors 10 on the basis that the arrangement of the measuring positions and the arrangement of the strain sensors are both equiangular arrangements around the tire rotational axis.

For example, it is preferable that the angular intervals of the measuring positions are not more than 30 degrees, more preferably not more than 20 degrees, still more preferably not more than 15 degrees, most preferably not more than 10 degrees. In other words, the number of the measuring positions is preferably not less than 12, more preferably not less than 18, still more preferably not less than 24, most preferably not less than 36.

Given that the number of the strain sensors 10 is 6, their identifying codes "n" are "10a", "10b", "10c", "10d", "10e" and "10f", and the number of the measuring positions is 36, their identifying codes "m" are P1,P2,P3 - - - P36, the above-mentioned equation 1 is for example:

when sensor 10a is at position P1

$$F[10a,P1]=a[P1] \times E[10a,P1]+b[P1],$$

when sensor 10a is at position P3

$$F[10a,P3]=a[P3] \times E[10a,P3]+b[P3].$$

To make more understandable, if the polar angle is used instead of P1, P2 - - - P36, then, in the case of FIG. 7 wherein the sensor 10a is at the polar angle of 0 deg, 10b at 60 deg, 10c at 120 deg, 10d at 180 deg, 10e at 240 deg, and 10f at 300 deg, the equation can be expressed, $$F[10a,0]=a[0] \times E[10a,0]+b[0]$$

$$F[10b,60]=a[60] \times E[10b,60]+b[60]$$

$$F[10c,120]=a[120] \times E[10c,120]+b[120]$$

$$F[10d,180]=a[180] \times E[10d,180]+b[180]$$

$$F[10e,240]=a[240] \times E[10e,240]+b[240]$$

$$F[10f,300]=a[300] \times E[10f,300]+b[300].$$

In the case of FIG. 8 wherein the tire is rotated by 10 degrees from the state shown in FIG. 7, namely, the sensor 10a is at the polar angle of 10 deg, 10b at 70 deg, 10c at 130 deg, 10d at 190 deg, 10e at 250 deg, and 10f at 310 deg, the equation can be expressed, $$F[10a,10]=a[10]\times E[10a,10]+b[10]$$

$$F[10b,70]=a[70]\times E[10b,70]+b[70]$$

$$F[10c,130]=a[130]\times E[10c,130]+b[130]$$

$$F[10d,190]=a[190]\times E[10d,190]+b[190]$$

$$F[10e,250]=a[250]\times E[10e,250]+b[250]$$

$$F[10f,310]=a[310]\times E[10f,310]+b[310].$$

Thus, according to the present invention, in order to define the above-mentioned equations, the constants a[m] and b[m] peculiar to the measuring positions "m" are determined in advance through an experiment.

During running, when a certain sensor "n" comes to a certain fixed measuring position "m", then: the sensor can output data indicative of the magnitude E[n,m] of the strain at the measuring position "m"; the data is fetched and the magnitude E[n,m] is decoded; and using the obtained magnitude E[n,m] and the above-mentioned predefined relational expression, the target force F[n,m] is computed. At the same time, as the remaining sensors come to the respective measuring positions, with respect to each sensor, the target force is computed in the same way as above.

In other words, the target force F is once computed based on the output data of one sensor at one measuring position. As the multiple sensors are provided on the tire sidewall, such computation of the target force F is performed with respect to each of the sensors. More specifically, at a certain point of time during running, when the multiple sensors come to the predetermined fixed measuring positions respectively, the output data of all of the sensors which are indicative of the magnitudes of strain at the respective measuring positions are read and the magnitudes of the strain are obtained. Then, with respect to each of the sensors, in other words, with respect to each of the fixed measuring positions, the target force is computed by the use of a relational expression effectual at the measuring position. Accordingly, on the magnitude of the target force, a plurality of intermediate results are obtained from the multiple sensors.

Then, in order to obtain the final result of the magnitude F, the arithmetic mean value of the intermediate results is computed.

For example, in the above-explained case of FIG. 7, there are six intermediate results F[10a,0], F[10b,60], F[10c,120], F[10d,180], F[10e,240] and F[10f,300]. Therefore, the mean value (F[10a,0]+F[10b,60]+F[10c,120]+F[10d,180]+F[10e,240]+F[10f,300])/6 is computed as the final result.

However, before computing the arithmetic mean value, a check is performed if each of the intermediate results is within a range of values expected for the measuring position. If out of the expected range, for example very large or vary small, the intermediate result is omitted and not counted in the number of the date. And using the remaining effective intermediate results within the respective expected ranges, the arithmetic mean value is computed.

For example, in the above-explained case of FIG. 7, if F[10a,120] is out of the range expected for the measuring position at the polar angle 120 degree, the intermediate result F[10a,120] is omitted and the mean value (F[10a,0]+F[10b,60]+F[10d,180]+F[10e,240]+F[10f,300])/5 is computed as the final result.

Such data validation check can be made at the stage of the magnitude E[n,m] of the strain or the raw data output from the sensor. Namely, with respect to each measuring position "m", a maximum value Emax[m] and a minimum value Emin[m] are determined in advance for example through an experiment. In the checking process, the magnitude E[n,m] is compared with Emax[m] and Emin[m] to determine whether E[n,m] is within the valid range between Emax[m] and Emin[m] or not. If not, the data is not used in the estimation. Practically, either way (1) or (2) is possible: (1) the subsequent computing of the force F[n,m] is not executed regarding the invalid data; (2) the computing of the force F[n,m] is executed, but when computing the arithmetic mean value, the force F[n,m] computed from the invalid data is excluded.

Further, it is also possible to perform the check at the stage of the intermediate result F[n,m]. In this case, it is effectual to make a mutual comparison of the intermediate results F[n,m]. In the mutual comparison, a result F[n,m] extraordinary larger or smaller than the other data is regarded as invalid, and the invalid result is excluded from the computing of the arithmetic mean value.

In order to locate the sensors 10 on the rolling tire, by the use of an angle sensor, e.g. an encoder, resolver and the like, the rotational angle (0 to 360 degrees) of the tire is detected to determine the polar angle of a reference point of the tire, and then the positions of the sensors 10 are determined.

In order to transmit the sensor output data from the rolling tire to an electrical control unit mounted on the vehicle body side, a wireless connection is used. It is therefore preferable that the above-mentioned sensor unit 20 contains a transponder which can transmit the date indicative of the magnitude of the sensed strain towards the electrical control unit in response to a query signal sent via an electromagnetic wave from the electrical control unit on the vehicle body side. The transponder comprises a receiver, transmitter, control circuit, data memory and the like which are formed on a semiconductor chip, and an antenna. In order to utilize the above-mentioned electromagnetic wave as the source of electric energy, a converter and an electric accumulator/condenser are also incorporated in the unit 20. The above-mentioned electrical control unit in this example constitutes a part of ABS (anti lock brake system).

The present invention is suitably adopted in a brake control system such as ABS of the automobiles, but it is also possible to adopt it in various computer-aided vehicle control systems as far as the back-and-forth-direction force is utilized.

The invention claimed is:

1. A method for estimating the magnitude of a back-and-forth-direction force exerted on a tire comprising:
   using a plurality of strain sensors fixed to a sidewall of the tire at circumferentially different positions around the rotational axis of the tire, each said strain sensor capable of outputting data on the magnitude of a strain occurred at the position of the strain sensor;
   reading the output data from the strain sensors when come to measuring positions, said measuring positions are a plurality of fixed positions predetermined around the tire rotational axis;
   in relation to each of the strain sensors at the respective measuring positions,
   calculating the back-and-forth-direction force as an intermediate result by the use of the data read from the strain sensor and a relational expression effectual for the measuring position at which the strain sensor is positioned, whereby a set of the intermediate results are obtained from the respective strain sensors; and computing a mean value of only the valid intermediate results or result so as to output it as the estimated magnitude of the back-and-forth-direction force.

2. The method according to claim 1, which further comprises
checking if said data read from the strain sensor is within a preset expected range to determine the intermediate result is valid.

3. The method according to claim 2, wherein
the data which is determined as being out of the preset expected range in said checking, is excluded from the calculating of the back-and-forth-direction force.

4. The method according to claim 2, wherein
the back-and-forth-direction force calculated from the data which is determined as being out of the preset expected range in said checking, is excluded from the computing of the mean value.

5. The method according to claim 1, wherein
said strain is a surface strain of the tire sidewall.

6. The method according to claim 1, wherein
said relational expression is a linear equation.

7. The method according to claim 1, wherein
the strain sensors are arranged equiangularly around the tire rotational axis.

8. The method according to claim 1, wherein
said predetermined fixed measuring positions are set at equiangular intervals around the tire rotational axis.

9. The method according to claim 8, wherein
said equiangular intervals are not more than 10 degrees.

10. The method according to claim 1, wherein
the strain sensors are arranged equiangularly around the tire rotational axis,
the measuring positions are set at equiangular intervals of not more than 10 degrees, and
the number of the measuring positions is an integral multiple of the number of the strain sensors.

* * * * *